US010717894B2

(12) United States Patent
Iyer et al.

(10) Patent No.: US 10,717,894 B2
(45) Date of Patent: Jul. 21, 2020

(54) RAPID SET AQUEOUS COATINGS

(71) Applicant: BASF SE, Ludwigshafen (DE)

(72) Inventors: Sridhar Iyer, Waxhaw, NC (US);
Randall Petrie, Charlotte, NC (US);
Michael A. Guibault, Fort Mill, SC (US)

(73) Assignee: BASF CORP, Florham Park, NJ (US)

( * ) Notice: Subject to any disclaimer, the term of this patent is extended or adjusted under 35 U.S.C. 154(b) by 0 days.

(21) Appl. No.: 15/304,492

(22) PCT Filed: Apr. 9, 2015

(86) PCT No.: PCT/EP2015/057649
§ 371 (c)(1),
(2) Date: Oct. 14, 2016

(87) PCT Pub. No.: WO2015/158588
PCT Pub. Date: Oct. 22, 2015

(65) Prior Publication Data
US 2017/0037263 A1 Feb. 9, 2017

Related U.S. Application Data

(60) Provisional application No. 61/979,932, filed on Apr. 15, 2014.

(51) Int. Cl.
*C09D 133/24* (2006.01)
*C09D 5/02* (2006.01)
*C09D 7/00* (2018.01)
*C09D 125/04* (2006.01)
*C09D 5/00* (2006.01)
*C08K 3/22* (2006.01)

(52) U.S. Cl.
CPC ............. *C09D 133/24* (2013.01); *C09D 5/00* (2013.01); *C09D 5/02* (2013.01); *C09D 5/024* (2013.01); *C09D 7/71* (2018.01); *C09D 125/04* (2013.01); *C08K 3/22* (2013.01); *C08K 2003/2227* (2013.01); *C08L 2201/54* (2013.01)

(58) Field of Classification Search
CPC .......... C09D 133/24; C09D 5/02; C09D 7/71; C09D 5/024; C09D 125/04; C09D 5/00
See application file for complete search history.

(56) References Cited

U.S. PATENT DOCUMENTS

| 4,386,992 A * | 6/1983 | Takegawa ................. C09J 5/04 156/327 |
| 5,219,914 A | 6/1993 | Warburton |
| 5,387,638 A * | 2/1995 | Nakamae ................. C08F 2/24 524/459 |
| 6,013,721 A * | 1/2000 | Schall ..................... C09D 5/004 524/515 |
| 6,337,106 B1 * | 1/2002 | Brown ..................... C09D 5/004 427/341 |
| 6,528,610 B1 | 3/2003 | Frouin et al. |
| 2007/0186813 A1 | 8/2007 | Smith |
| 2010/0173089 A1 | 7/2010 | Smith |

FOREIGN PATENT DOCUMENTS

| EP | 0739961 A1 | 10/1996 |
| EP | 0811663 A2 | 12/1997 |

OTHER PUBLICATIONS

International Search Report and Written Opinion of the International Searching Authority, Application No. PCT/EP2015/057649, dated Jun. 30, 2015, 10 pages.
Garnder, P.N. "Conversion Between Stormer Viscometer Krebs Units and Viscosity Cup Drain Time", Jan. 1, 1999, XP055196506.

* cited by examiner

*Primary Examiner* — Peter D. Mulcahy
(74) *Attorney, Agent, or Firm* — Faegre Drinker Biddle & Reath LLP

(57) ABSTRACT

Two-part aqueous coating compositions as well as methods of using thereof are described. The first coating component can comprise one or more polymers and the second coating component can comprise a flocculant. The first coating component and the second coating component can be provided as separate aqueous compositions. The first coating component and a second coating component that can be co-applied (e.g., simultaneously or sequentially) to a surface form a rapid set coating.

22 Claims, No Drawings

RAPID SET AQUEOUS COATINGS

CROSS-REFERENCE TO RELATED APPLICATIONS

This application is a national stage application filed under 35 U.S.C. § 371 of PCT/EP2015/057649 filed Apr. 9, 2015, which claims the benefit of and priority to U.S. Patent Application No. 61/979,932 filed on Apr. 15, 2014, the disclosures of which are expressly incorporated herein by reference in their entireties.

BACKGROUND

The formation of durable, high quality coatings on exterior surfaces poses numerous challenges. Notably, coatings on exterior surfaces typically remain exposed to the elements during application and drying. As a result, weather conditions during coating application and drying can impact the quality of exterior coatings. For example, rainfall during and/or after coating applications can wash-off some or all of the coating, resulting in coating failure. By shortening the setting time of coatings, instances of coating failure, such as those due to unanticipated rainfall, can be minimized. Further, aqueous coatings typically cannot be applied in a single coat to achieve the desired film thickness due to film cracking upon curing, and as a result such coatings are often applied in multiple coats resulting in increased labor costs. In certain applications, external methods of accelerating the curing of coatings are employed, such as dryers to speed up the curing process resulting in increased energy costs.

SUMMARY

Two-part aqueous coating compositions as well as methods of using thereof are described. The two-part aqueous coating compositions can comprise a first coating component and a second coating component that can be co-applied (e.g., simultaneously or sequentially) to form a rapid set coating. The first coating component can comprise a first polymer, and the first coating component can have a viscosity of from 50 to 40,000 cP (measured using a Brookfield RV viscometer with spindle #3 at 2 rpm at 20° C.). The second coating component can comprise a flocculant. In some embodiments, the first coating component can have a viscosity of from 500 to 30,000 cP, from 1,000 to 12,000 cP, from 2,000 to 12,000 cP, from 2,000 to 8,000 cP, or from 2,000 to 5,000 cP.

The first polymer in the first coating component can be produced by emulsion polymerization. In some embodiments, the first polymer is derived from one or more monomers including styrene and butadiene. In some embodiments, the first polymer is derived from one or more monomers including a (meth)acrylate monomer and optionally styrene. In some embodiments, the first polymer is derived from an acid monomer. For example, the acid monomer can be selected from the group consisting of acrylic acid, methacrylic acid, itaconic acid, maleic acid, fumaric acid, and combinations thereof. In some embodiments, the first polymer can be derived from at least one low glass-transition temperature ($T_g$) monomer selected from the group consisting of butyl acrylate and 2-ethylhexyl acrylate, at least one high $T_g$ monomer selected from the group consisting of methyl methacrylate and styrene, or from both a low $T_g$ monomer and a high $T_g$ monomer. In some embodiments, the first polymer can be derived from (meth) acrylamide. In some embodiments, the first polymer can be derived from a crosslinkable monomer. For example, the crosslinkable monomer can be selected from the group consisting of diacetone acrylamide (DAAM), a monomer comprising 1,3-diketo groups, a silane crosslinker, or a combination thereof. In some embodiments, the first polymer has a $T_g$ of from −70° C. to 50° C., from −50° C. to 25° C., or from −50° C. to 0° C.

In some embodiments, the first polymer can be produced by emulsion polymerization and derived from two or more monomers including a (meth)acrylate monomer and an acid monomer. For example, the first polymer can be a polymer derived from a (meth)acrylate monomer, an acid monomer, and a crosslinkable monomer (e.g., diacetone acrylamide (DAAM), a monomer comprising 1,3-diketo groups such as acetoacetoxyethyl methacrylate (AAEM), a silane crosslinker, or a combination thereof).

In some embodiments, the first coating component can comprise a first polymer and a second polymer. The first polymer can be produced by emulsion polymerization and derived from two or more monomers including a (meth) acrylate monomer and an acid monomer. The first polymer can have a $T_g$ of from −50° C. to −5° C. (e.g., a $T_g$ of from −36° C. to −23° C.), and can be present in the first coating component in an amount of 10-90% by weight, based on the total polymer content of the first coating component. In certain embodiments, the first polymer can be present in the first coating component in an amount of 10-50% or 20-40% by weight, based on the total polymer content of the first coating component. The second polymer can be produced by emulsion polymerization and derived from two or more monomers including a (meth)acrylate monomer and an acid monomer. The second polymer can have a $T_g$ of from −15° C. to 50° C. (e.g., a $T_g$ of from −12° C. to 25° C.), and can be present in the first coating component in an amount of 10-90% by weight (e.g., 50-90% or 60-80% by weight), based on the total polymer content of the first coating component. In some embodiments, the $T_g$ of the first polymer is below the $T_g$ of the second polymer. In some examples, at least one of the first polymer and the second polymer can be a styrene acrylic polymer. In certain examples, the first polymer and the second polymer are pure acrylics. The first polymer and the second polymer can each be derived from at least one low $T_g$ monomer selected from the group consisting of butyl acrylate and 2-ethylhexyl acrylate. Optionally, at least one of the first polymer and the second polymer are further derived from at least one high $T_g$ monomer selected from the group consisting of methyl methacrylate and styrene. At least one of the first polymer and the second polymer can be derived from a crosslinkable monomer. The acid monomers in the first polymer and the second polymer can each be selected from those listed above. In some cases, at least one of the first polymer and the second polymer can be further derived from (meth)acrylamide. In certain embodiments, the first polymer can have a $T_g$ of from −36° C. to −23° C., and can be derived from one or more monomers including one of more of butyl acrylate and 2-ethylhexyl acrylate, one or more acid monomers, a crosslinkable monomer, and optionally styrene and/or methyl methacrylate. In certain embodiments, the second polymer can have a $T_g$ of from −12° C. to 0° C., and can be derived from one or more monomers including one of more of butyl acrylate and 2-ethylhexyl acrylate, one or more acid monomers, a crosslinkable monomer, and optionally styrene and/or methyl methacrylate. The first polymer and the second polymer can be dispersed in an aqueous medium.

In some embodiments, the first coating component can have a volume solids of greater than 40%. In some embodiments, the first coating component can have a weight solids of greater than 50%. In some embodiments, the weight ratio of the dry weight of flocculant in the second coating component to the dry weight of polymer in the first coating component is from 0.1:16 to 5:16 or from 0.5:16 to 3:16.

In some embodiments, the first coating component and the second coating component, when applied as a film (e.g., when simultaneously applied to a surface), dried and weathered for 1000 hours, can pass the mandrel bend test set forth in ASTM D 6083-05 at −26° C., can pass the mandrel bend test set forth in ASTM D 6083-05 at −18° C., and/or can exhibit tensile strength of greater than 140 psi as measured according to the standard methods described in ASTM D-2370.

Further described herein are methods of forming a coating on a surface. The method can include applying the first coating component and the second coating component of the two-part aqueous coating compositions as described herein to a surface. The surface can be an architectural surface, such as a roof surface and/or a wall. In some embodiments, first coating component and the second coating component can be simultaneously applied to the surface. In certain embodiments, the first coating component and the second coating component can be simultaneously applied to the surface using a machine configured to spray both the first coating component and the second coating component onto the surface. The combination of the first coating component and the second coating component in the two-part aqueous coating composition produce a coating on the surface.

The details of one or more embodiments are set forth in the description below. Other features, objects, and advantages will be apparent from the description and from the claims.

DETAILED DESCRIPTION

As used herein, "(meth)acryl . . . " includes acryl . . . , methacryl . . . , diacryl . . . , and dimethacryl . . . . For example, the term "(meth)acrylate monomer" includes acrylate, methacrylate, diacrylate, and dimethacrylate monomers.

Provided herein are two-part aqueous coating compositions. The two-part aqueous coating compositions can include a first coating component and a second coating component. The two coating components can be co-applied to a surface (e.g., simultaneously or sequentially) to form a rapid set coating.

The first coating component can comprise a first polymer. The first polymer can be a homopolymer or a copolymer. The first polymer can be a pure acrylic polymer (i.e., a polymer derived exclusively from (meth)acrylate monomers), a styrene-acrylic polymer (i.e., a polymer derived from styrene and one or more (meth)acrylate monomers), a styrene-butadiene polymer (i.e., a polymer derived from butadiene and styrene monomers), a vinyl-acrylic polymer (i.e., a polymer derived from one or more vinyl ester monomers and one or more (meth)acrylate monomers), a vinyl chloride polymer (i.e., a polymer derived from one or more vinyl chloride monomers), a vinylidene fluoride polymer (i.e., a polymer derived from one or more vinylidene fluoride monomers), a silicone polymer (i.e., a polymer derived from one or more silicone monomers), a polyurethane polymer, an acrylic-polyurethane hybrid polymer, a vinyl alkanoate polymer (i.e., a polymer derived from one or more vinyl alkanoate monomers, such as polyvinyl acetate or a copolymer derived from ethylene and vinyl acetate monomers), or a combination thereof. In some embodiments, the first polymer can be an anionically stabilized polymer, such as an anionically stabilized acrylic-based polymer. Acrylic-based polymers include polymers derived from one or more (meth)acrylate monomers such as pure acrylics, styrene acrylics, and vinyl acrylics. In some embodiments, the polymer is produced by emulsion polymerization.

In some embodiments, the first polymer can have a glass-transition temperature ($T_g$), as measured by differential scanning calorimetry (DSC) using the mid-point temperature using the method described, for example, in ASTM 3418/82, of at least −70° C. (e.g., at least −65° C., at least −60° C., at least −55° C., at least −50° C., at least −45° C., at least −40° C., at least −35° C., at least −30° C., at least −25° C., at least −20° C., at least −15° C., at least −10° C., at least 5° C., at least 0° C., at least 5° C., at least 10° C., at least 15° C., at least 20° C., at least 25° C., at least 30° C., at least 35° C., at least 40° C., or at least 45° C.). In some embodiments, the first polymer can have a $T_g$, as measured by DSC, of 50° C. or less (e.g., 45° C. or less, 40° C. or less, 35° C. or less, 30° C. or less, 25° C. or less, 20° C. or less, 15° C. or less, 10° C. or less, 5° C. or less, 0° C. or less, −5° C. or less, −10° C. or less, −15° C. or less, −20° C. or less, −25° C. or less, −30° C. or less, −35° C. or less, −40° C. or less, −45° C. or less, −50° C. or less, −55° C. or less, −60° C. or less, or −65° C. or less).

The first polymer can have a $T_g$, as measured by DSC, ranging from any of the minimum values described above to any of the maximum values described above. For example, the first polymer can have a $T_g$, as measured by DSC, of from −70° C. to 50° C. (e.g., a $T_g$ of from −50° C. to 25° C., a $T_g$ of from −50° C. to 0° C., or a $T_g$ of from −50° C. to −20° C.).

In some embodiments, the first coating component can further comprise a second polymer. The second polymer can be a polymer such as those described above with respect to the first polymer. In some embodiments, the second polymer can be an anionically stabilized acrylic-based polymer (e.g., an acrylic polymer, a styrene-acrylic polymer, or a vinyl-acrylic polymer). In certain examples, the second polymer can be a polymer produced by emulsion polymerization and derived from two or more monomers including a (meth)acrylate monomer and an acid monomer.

The second polymer can have a $T_g$, as measured by DSC, of at least −15° C. (e.g., at least −10° C., at least −5° C., at least 0° C., at least 5° C., at least 10° C., at least 15° C., at least 20° C., at least 25° C., at least 30° C., at least 35° C., at least 40° C., or at least 45° C.). In some embodiments, the second polymer can have a $T_g$, as measured by DSC, of 50° C. or less (e.g., 45° C. or less, 40° C. or less, 35° C. or less, 30° C. or less, 25° C. or less, 20° C. or less, 15° C. or less, 10° C. or less, 5° C. or less, 0° C. or less, −5° C. or less, or −10° C. or less).

The second polymer can have a $T_g$, as measured by DSC, ranging from any of the minimum values described above to any of the maximum values described above. For example, the second polymer can have a $T_g$, as measured by DSC, of from −15° C. to 50° C. (e.g., a $T_g$ of from −15° C. to 25° C., a $T_g$ of from −15° C. to 10° C., or a $T_g$ of from −15° C. to 0° C.).

When the first coating component comprises a first polymer and a second polymer, the first polymer and the second polymer can be present in the first coating component in varying amounts so as to provide a resultant coating with the desired properties for a particular application. For example, the first polymer can be present in the first coating component in an amount of at least 10% by weight (e.g., at least 20% by weight, at least 30% by weight, at least 40% by weight, at least 50% by weight, at least 60% by weight, at least 70% by weight, at least 80% by weight, or at least 90% by weight), based on the total polymer content of the first coating component. In some embodiments, the first polymer can be present in the first coating component in an amount of 90% or less by weight (e.g., 90% or less by weight, 80% or less by weight, 70% or less by weight, 60% or less by weight, 50% or less by weight, 40% or less by weight, 30% or less by weight, or 20% or less by weight), based on the total polymer content of the first coating component.

The first polymer can be present in the first coating component in an amount ranging from any of the minimum values described above to any of the maximum values described above. For example, the first polymer can be present in the first coating component in an amount of 10%-90% by weight (e.g., 10%-50% or 20%-40% by weight), based on the total polymer content of the first coating component.

The second polymer can be present in the first coating component in an the in an amount of at least 10% by weight (e.g., at least 20% by weight, at least 30% by weight, at least 40% by weight, at least 50% by weight, at least 60% by weight, at least 70% by weight, at least 80% by weight, or at least 90% by weight), based on the total polymer content of the first coating component. In some embodiments, the second polymer can be present in the first coating component in an amount of 90% or less by weight (e.g., 90% or less by weight, 80% or less by weight, 70% or less by weight, 60% or less by weight, 50% or less by weight, 40% or less by weight, 30% or less by weight, or 20% or less by weight), based on the total polymer content of the first coating component.

The second polymer can be present in the first coating component in an amount ranging from any of the minimum values described above to any of the maximum values described above. For example, the second polymer can be present in the first coating component in an amount of 10%-90% by weight (e.g., 50%-90% or 60%-80% by weight), based on the total polymer content of the first coating component In certain embodiments where the first coating component comprises a first polymer and a second polymer, the first polymer and the second polymer can exhibit differing $T_g$ values. In some cases, the $T_g$ of the first polymer, as measured by DSC, can be less (e.g., at least 5° C. less, at least 10° C. less, at least 15° C. less, at least 20° C. less, or at least 25° C. less) than the $T_g$ of the second polymer. For example, in some cases, the $T_g$ of the first polymer, as measured by DSC, can be from −50° C. to −23° C., −40° C. to −25° C., −30° C. to −25° C., −36° C. to −23° C., or −33° C. to −26° C., and the $T_g$ of the second polymer, as measured by DSC, can be from −12° C. to 25° C., −12° C. to 0° C., −10° C. to −2° C., −12° C. to 0° C., −9° C. to 5° C., or −5° C. to 0° C.

The first polymer and/or the second polymer can be acrylic-based polymers can be derived from greater than 55% by weight or greater of one or more (meth)acrylate monomers (e.g., 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the (meth)acrylate monomer) based on the total weight of monomers from which the polymer is derived. In some embodiments, the (meth)acrylate monomers can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). In some examples, the one or more (meth)acrylates for preparing the first polymer and/or second polymer are selected from butyl acrylate, 2-ethylhexyl acrylate, methyl methacrylate, and combinations thereof.

The first polymer and/or the second polymer can further be derived from an acid monomer. Suitable acid monomers can include α,β-monoethylenically unsaturated mono- and dicarboxylic acids (e.g., acrylic acid, methacrylic acid, itaconic acid, maleic acid, fumaric acid, crotonic acid, dimethacrylic acid, ethylacrylic acid, allylacetic acid, vinylacetic acid, mesaconic acid, methylenemalonic acid, or citraconic acid). In some examples, the acid monomers in the first polymer and/or the second polymer can each be selected from the group consisting acrylic acid, methacrylic acid, itaconic acid, maleic acid, fumaric acid, and mixtures thereof.

Optionally, the first polymer and/or the second polymer are derived from at least one low Tg monomer. As used herein, a low Tg monomer refers to a monomer that, when homopolymerized, forms a polymer having a glass transition temperature, as measured using differential scanning calorimetry (DSC), of −40° C. or less. Examples of suitable low Tg monomers include for example, butyl acrylate (n-butyl acrylate, $T_g$=−54° C.), n-hexyl acrylate ($T_g$=−45° C.), 2-ethylhexyl acrylate ($T_g$=−85° C.), isodecyl acrylate ($T_g$=−55° C.), dodecyl methacrylate ($T_g$=−65° C.), 2-ethoxyethyl acrylate ($T_g$=−50° C.), 2-methoxy acrylate ($T_g$=−50° C.), and 2-(2-ethoxyethoxy)ethyl acrylate ($T_g$=−70° C.). In certain embodiments, the first polymer and/or the second polymer can each be derived from at least one low $T_g$ monomer selected from the group consisting of butyl acrylate and 2-ethylhexyl acrylate.

Optionally, the first polymer and/or the second polymer are derived from at least one high Tg monomer. As used herein, a high Tg monomer refers to a monomer that, when homopolymerized, forms a polymer having a $T_g$, as measured using DSC, of greater than 40° C. Examples of suitable high Tg monomers include for example, methyl methacrylate ($T_g$=120° C.), ethyl methacrylate ($T_g$=65° C.), tert-butyl methacrylate ($T_g$=118° C.), isobutyl methacrylate ($T_g$=53° C.), hydroxyethyl methacrylate ($T_g$=57° C.), cyclohexyl methacrylate ($T_g$=92° C.), 2-phenoxyethyl methacrylate ($T_g$=54° C.), benzyl methacrylate ($T_g$=54° C.), hydroxypropyl methacrylate ($T_g$=76° C.), styrene ($T_g$=100° C.), 4-acetostyrene ($T_g$=116° C.), acrylonitrile ($T_g$=125° C.), 4-bromostyrene ($T_g$=118° C.), 4-tert-butylstyrene ($T_g$=127° C.), 2,4-dimethylstyrene ($T_g$=112° C.), 2,5-dimethylstyrene ($T_g$=143° C.), 3,5-dimethylstyrene ($T_g$=104° C.), isobornyl acrylate ($T_g$=94° C.), isobornyl methacrylate ($T_g$=110° C.), 4-methoxystyrene ($T_g$=113° C.), 4-methylstyrene ($T_g$=97° C.), 3-methylstyrene ($T_g$=97° C.), and 2,4,6-trimethylstyrene ($T_g$=162° C.). In certain embodiments, the first polymer and/or the second polymer can each be derived from at least one high $T_g$ monomer selected from the group consisting of methyl methacrylate and styrene.

In some embodiments, at least one of the first polymer and the second polymer is further derived from an acrylamide or an alkyl-substituted acrylamide. Suitable examples include N-tert-butylacrylamide and N-methyl(meth)acrylamide. In some embodiments, at least one of the first polymer and the second polymer is further derived from (meth)acrylamide.

Optionally, at least one of the first polymer and the second polymer is derived from a crosslinkable monomer. For example, the crosslinkable monomer can include diacetone acrylamide (DAAM) or a self-crosslinking monomer such as a monomer comprising 1,3-diketo groups or a silane crosslinker. Examples of monomers comprising 1,3-diketo groups include acetoacetoxyalkyl (meth)acrylates, such as acetoacetoxyethyl (meth)acrylate (AAEM), acetoacetoxypropyl (meth)acrylate, acetoacetoxybutyl (meth)acrylate, and 2,3-di(acetoacetoxy)propyl (meth)acrylate; allyl acetoacetate; vinyl acetoacetate; and combinations thereof. Examples of suitable silane crosslinkers include 3-methacryloxypropyl trimethoxysilane, 3-mercaptopropyl trimethoxysilane, vinyl-triethoxysilane, and polyvinyl-siloxane oligomers such as DYNASYLAN 6490, a polyvinyl siloxane oligomer derived from vinyltrimethoxysilane, and DYNASYLAN 6498, a polyvinyl siloxane oligomer derived from vinyltriethoxysilane, both commercially available from Evonik Degussa GmbH (Essen, Germany) The polyvinyl siloxane oligomer can have the following structure:

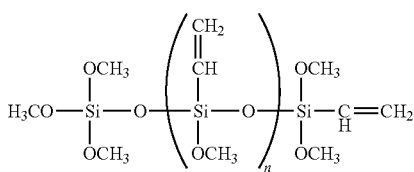

wherein n is an integer from 1 to 50 (e.g., 10). Crosslinkable monomers as described herein can further include monomers such as divinylbenzene; 1,4-butanediol diacrylate; methacrylic acid anhydride; and monomers containing urea groups (e.g., ureidoethyl (meth)acrylate, acrylamidoglycolic acid, and methacrylamidoglycolate methyl ether. Additional examples of crosslinkable monomers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinkable monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, the first polymer and/or the second polymer can include from 0 to 5% by weight of one or more crosslinkable monomers.

The first polymer and/or second polymer can further include additional monomers. Further examples of additional monomers include vinylaromatics such as α- and p-methylstyrene, α-butylstyrene, 4-n-butylstyrene, 4-n-decylstyrene, and vinyltoluene; conjugated dienes (e.g., isoprene); anhydrides of α,β-monoethylenically unsaturated mono- and dicarboxylic acids (e.g., maleic anhydride, itaconic anhydride, and methylmalonic anhydride); (meth) acrylonitrile; vinyl and vinylidene halides (e.g., vinyl chloride and vinylidene chloride); vinyl esters of $C_1$-$C_{18}$ mono- or dicarboxylic acids (e.g., vinyl acetate, vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate).

Further examples of additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); phosphorus-containing monomers (e.g., dihydrogen phosphate esters of alcohols in which the alcohol contains a polymerizable vinyl or olefenic group, allyl phosphate, phosphoalkyl(meth)acrylates such as 2-phosphoethyl(meth)acrylate (PEM), 2-phosphopropyl(meth)acrylate, 3-phosphopropyl (meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyhmeth)acrylate, 2-hydroxyethyl(meth)acrylate, 3-hydroxypropyl(meth)acrylate, ethylene oxide condensates of (meth)acrylates, $H_2C$=$C(CH_3)COO(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy)phosphinylalkyhmeth)acrylates, (hydroxy)phosphinylmethyl methacrylate, and combinations thereof); alkylaminoalkyl (meth)acrylates or alkylaminoalkyhmeth) acrylamides or quatemization products thereof (e.g., 2-(N, N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The first polymer and the second polymer can independently be pure acrylics, styrene acrylics, or vinyl acrylics. In some embodiments, the first polymer is a styrene acrylic polymer (i.e., the first polymer is a styrene acrylic polymer, the second polymer is a styrene acrylic polymer, or both the first polymer and the second polymer are styrene acrylic polymers). In other embodiments, at least one of the first polymer and the second polymer is a pure acrylic (i.e., the first polymer is a pure acrylic, the second polymer is a pure acrylic, or both the first polymer and second polymer are pure acrylics).

In some embodiments, the first polymer can have a $T_g$ of from −36° C. to −23° C., and can be derived from one or more monomers including one of more of butyl acrylate and 2-ethylhexyl acrylate, one or more acid monomers, a crosslinkable monomer, and optionally styrene and/or methyl methacrylate. In certain embodiments, the first polymer comprises an acrylic-based polymer derived from:
(i) 10-18% by weight methyl methacrylate;
(ii) 55-70% by weight butyl acrylate;
(iii) 15-30% by weight 2-ethylhexylacrylate;
(iv) greater than 0 to 5% by weight acid monomers; and
(v) greater than 0 to 5% by weight crosslinkable monomers.

In some embodiments, the second polymer can have a $T_g$ of from −12° C. to 0° C., and can be derived from one or more monomers including one of more of butyl acrylate and 2-ethylhexyl acrylate, one or more acid monomers, a crosslinkable monomer, and optionally styrene and/or methyl methacrylate. In certain embodiments, the second polymer comprises an acrylic-based polymer derived from:
(i) 40-55% by weight butyl acrylate;
(ii) 10-20% by weight 2-ethylhexylacrylate;
(iii) 25-40% by weight methyl methacrylate;
(iv) greater than 0 to 5% by weight acid monomers; and
(v) greater than 0 to 5% by weight crosslinkable monomers.

The first polymer and the second polymer (when present) can be prepared by polymerizing the monomers using free-radical emulsion polymerization. The monomers for the first polymer and the second polymer (when present) can be prepared as aqueous dispersions. The emulsion polymerization temperature is generally from 10° C. to 95° C., from 30° C. to 95° C., or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

The first polymer or second polymer (when present) can each independently be produced by single stage polymerization or multiple stage polymerization. In some embodiments, the first polymer and the second polymer are each polymerized separately to produce a first dispersion including a plurality of polymer particles including the first polymer and a second dispersion comprising a plurality of polymer particles including the second polymer. The first and second dispersions can then be combined to provide a dispersion including the first and second polymers. In some embodiments, the first polymer and the second polymer are provided in the same polymer particle by using multiple stage polymerization such that one of the first polymer and second polymer can be present as a first stage polymer of a multistage polymer (e.g., as a core in a core/shell polymer particle) and one of the first polymer and second polymer can be present as a second stage polymer of a multistage polymer (e.g., as a shell in a core/shell polymer particle).

One or more surfactants can be included in the aqueous dispersions to improve certain properties of the dispersions, including particle stability. For example, oleic acid, sodium laureth sulfate, and alkylbenzene sulfonic acid or sulfonate surfactants could be used. Examples of commercially available surfactants include Calfoam® ES-303, a sodium laureth sulfate, and Calfax® DB-45, a sodium dodecyl diphenyl oxide disulfonate, both available from Pilot Chemical Company (Cincinnati, Ohio). In general, the amount of surfactants employed can be from 0.01 to 5%, based on the total amount of the monomers to be polymerized.

Small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the polymers.

In the case of polymers derived from styrene and butadiene, the polymer can be produced by high temperature polymerization (e.g., polymerization at a temperature of 40° C. or greater, such as at a temperature of from 40° C. to 100° C.) or by low temperature polymerization (e.g., polymerization at a temperature of less than 40° C., such as at a temperature of from 5° C. to 25° C.). As such, polymers derived from styrene and butadiene can include varying ratios of cis-1,4 butadiene units to trans-1,4 butadiene units.

As described above, polymers derived from styrene and butadiene can be polymerized in a continuous, semi-batch or batch process. Once the desired level of conversion is reached, the polymerization reaction can be terminated by the addition of a shortstop to the reactor. The shortstop reacts rapidly with free radicals and oxidizing agents, thus destroying any remaining initiator and polymer free radicals and preventing the formation of new free radicals. Exemplary shortstops include organic compounds possessing a quinonoid structure (e.g., quinone) and organic compounds that may be oxidized to a quinonoid structure (e.g., hydroquinone), optionally combined with water soluble sulfides such as hydrogen sulfide, ammonium sulfide, or sulfides or hydrosulfides of alkali or alkaline earth metals; N-substituted dithiocarbamates; reaction products of alkylene polyamines with sulfur, containing presumably sulfides, disulfides, polysulfides and/or mixtures of these and other compounds; dialkylhydroxylamines; N,N'-dialkyl-N,N'-methylenebishydroxylamines; dinitrochlorobenzene; dihydroxydiphenyl sulfide; dinitrophenylbenzothiazyl sulfide; and mixtures thereof. In the case of high temperature polymerizations, polymerization can be allowed to continue until complete monomer conversion, i.e., greater than 99%, in which case a shortstop may not be employed.

Once polymerization is terminated (in either the continuous, semi-batch or batch process), the unreacted monomers can be removed from the polymer dispersion. For example, butadiene monomers can be removed by flash distillation at atmospheric pressure and then at reduced pressure. Styrene monomers can be removed by steam stripping in a column.

If desired, polymers derived from styrene and butadiene can be agglomerated, e.g., using chemical, freeze or pressure agglomeration, and water removed to produce a solids content of greater than 50% to 75%.

An antioxidant can be added to polymers derived from styrene and butadiene to prevent oxidation of the double bonds of the polymer, and can either be added before or after vulcanization of the polymer. The antioxidants can be, for example, substituted phenols or secondary aromatic amines. Antiozonants can also be added to polymers derived from styrene and butadiene to prevent ozone present in the atmosphere from cracking the polymer by cleaving the double bonds in the polymer. Prevulcanization inhibitors can also be added to polymers derived from styrene and butadiene to prevent premature vulcanization or scorching of the polymer.

If desired, polymers derived from styrene and butadiene can be vulcanized or cured to crosslink the polymer thereby increasing the tensile strength and elongation of the rubber by heating the polymer, typically in the presence of vulcanizing agents, vulcanization accelerators, antireversion agents, and optionally crosslinking agents. Exemplary vulcanizing agents include various kinds of sulfur such as sulfur powder, precipitated sulfur, colloidal sulfur, insoluble sulfur and high-dispersible sulfur; sulfur halides such as sulfur monochloride and sulfur dichloride; sulfur donors such as 4,4'-dithiodimorpholine; selenium; tellurium; organic peroxides such as dicumyl peroxide and di-tert-butyl peroxide; quinone dioximes such as p-quinone dioxime and p,p'-dibenzoylquinone dioxime; organic polyamine compounds such as triethylenetetramine, hexamethylenediamine carbamate, 4,4'-methylenebis(cyclohexylamine) carbamate and 4,4'-methylenebis-o-chloroaniline; alkylphenol resins having a methylol group; and mixtures thereof. In some examples, the vulcanizing agents include sulfur dispersions or sulfur donors. The vulcanizing agent can be present from 0.1 to 15%, from 0.3 to 10%, or from 0.5 to 5%, by weight based on the weight of the polymer.

Exemplary vulcanization accelerators include sulfenamide-type vulcanization accelerators such as N-cyclohexyl-2-benzothiazole sulfenamide, N-t-butyl-2-benzothiazole sulfenamide, N-oxyethylene-2-benzothiazole sulfenamide, N-oxydiethylene-2-benzothiazole sulfenamide, N-oxydiethylene-thiocarbamyl-N-oxydiethylene sulfenamide, N-oxyethylene-2-benzothiazole sulfenamide and N,N'-diisopropyl-2-benzothiazole sulfenamide; guanidine-type vulcanization accelerators such as diphenylguanidine, di-o-tolylguanidine and di-o-tolylbiguanidine; thiourea-type vulcanization accelerators such as thiocarboanilide, di-o-tolyl-thiourea, ethylenethiourea, diethylenethiourea, dibutylthiourea and trimethylthiourea; thiazole-type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt, 4-morpholinyl-2-benzothiazole disulfide and 2-(2,4-dinitrophenylthio)benzothiazole; thiadiazine-type vulcanization accelerators such as activated thiadiazine; thiuram-type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid-type vulcanization accelerators such as sodium dimethyldithiocarbamate, sodium diethyldithiocarbamate, sodium di-n-butyldithiocarbamate, lead dimethyldithiocarbamate, lead diamyldithiocarbamate, zinc diamyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbamate, tellurium diethyldithiocarbamate, bismuth dimethyldithiocarbamate, selenium dimethyldithiocarbamate, selenium diethyldithiocarbamate, cadmium diethyldithiocarbamate, copper dimethyldithiocarbamate, iron dimethyldithiocarbamate, diethylamine diethyldithiocarbamate, piperidinium pentamethylene dithiocarbamate and pipecoline pentamethylene dithiocarbamate; xanthogenic acid-type vulcanization accelerators such as sodium isopropylxanthogenate, zinc isopropylxanthogenate and zinc butylxanthogenate; isophthalate-type vulcanization accelerators such as dimethylammonium hydrogen isophthalate; aldehyde amine-type vulcanization accelerators such as butyraldehyde-amine condensation products and butyraldehyde-monobutylamine condensation products; and mixtures thereof. The vulcanization accelerator can be present within a range of from 0.1 to 15%, from 0.3 to 10%, or from 0.5 to 5%, by weight based on the weight of the polymer.

Antireversion agents can also be included in the vulcanization system to prevent reversion, i.e., an undesirable decrease in crosslink density. Suitable antireversion agents include zinc salts of aliphatic carboxylic acids, zinc salts of monocyclic aromatic acids, bismaleimides, biscitraconimides, bisitaconimides, aryl bis-citraconamic acids, bissuccinimides, and polymeric bissuccinimide polysulfides (e.g., N,N'-xylenedicitraconamides). The antireversion agent can be present in a range of from 0 to 5%, from 0.1 to 3%, or from 0.1 to 2% by weight based on the weight of the polymer.

In some embodiments, the first polymer and the second polymer (when present) can be dispersed in an aqueous medium to form an aqueous dispersion. The aqueous dispersion can be used to form the first coating component. The first coating component can further include a filler, a pigment, a dispersing agent, a thickener, a defoamer, a surfactant, a biocide, a coalescing agent, a flame retardant, a stabilizer, a curing agent, a flow agent, a leveling agent, a hardener, or a combination thereof.

In some embodiments, the first coating component can further include at least one filler such as a pigment or extender. The term "pigment" as used herein includes compounds that provide color or opacity to the coating component. Examples of suitable pigments include metal oxides, such as titanium dioxide, zinc oxide, iron oxide, or combinations thereof. The at least one pigment can be selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Examples of commercially titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos WorldWide, Inc. Suitable pigment blends of metal oxides are sold under the marks Minex® (oxides of silicon, aluminum, sodium and potassium commercially available from Unimin Specialty Minerals), Celite® (aluminum oxide and silicon dioxide commercially available from Celite Company), and Atomite® (commercially available from Imerys Performance Minerals). Exemplary fillers also include clays such as attapulgite clays and kaolin clays including those sold under the Attagel® and Ansilex® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), Wollastonite (calcium metasilicate), and combinations thereof. More preferably, the at least one filler includes $TiO_2$, $CaCO_3$, and/or a clay.

Generally, the mean particle sizes of the filler ranges from about 0.01 to about 50 microns. For example, the $TiO_2$ particles used in the aqueous coating composition typically have a mean particle size of from about 0.15 to about 0.40 microns. The filler can be added to the aqueous coating component as a powder or in slurry form. The filler is preferably present in the aqueous coating component in an amount from about 5 to about 50 percent by weight, more preferably from about 10 to about 40 percent by weight (i.e. the weight percentage of the filler based on the total weight of the coating component).

Examples of suitable pigment dispersing agents are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener.

Defoamers serve to minimize frothing during mixing and/or application of the coating component. Suitable defoamers include organic defoamers such as mineral oils, silicone oils, and silica-based defoamers. Exemplary silicone oils include polysiloxanes, polydimethylsiloxanes, polyether modified polysiloxanes, and combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Suitable surfactants include nonionic surfactants and anionic surfactants. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical.

Other suitable additives that can optionally be incorporated into the first coating component include coalescing agents (coalescents), pH modifying agents, biocides, co-solvents and plasticizers, crosslinking agents (e.g., quick-setting additives, for example, a polyamine such as polyethyleneimine), dispersing agents, rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, flatting agents, humectants, insecticides, lubricants, odorants, oils, waxes and slip aids, soil repellants, stain resisting agents, and combinations thereof.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc.

Exemplary co-solvents and humectants include ethylene glycol, propylene glycol, diethylene glycol, and combinations thereof.

Exemplary crosslinking agents include dihydrazides (e.g., dihydrazides of adipic acid, succinic acid, oxalic acid, glutamic acid, or sebastic acid). The dihydrazides can be used, for example, to crosslink diacetone acrylamide or other crosslinkable monomers.

In some embodiments, the first coating component can include the following components (based on total weight of the first coating component): water 6.8-17.2% by weight, propylene glycol 0.5-2.5% by weight, pigment dispersing agent 0.4-0.85% by weight, one or more polymer dispersions (at 55-65% by weight polymer(s)) 37.8-41.3% by weight, plasticizer 0-1.0% by weight, defoamer 0.3-1.4% by weight, non-ionic surfactant 0-0.1% by weight, thickener 0.1-0.4% by weight, titanium dioxide 3.0-11.2% by weight, zinc oxide 0-3.4% by weight, calcium carbonate 27.7-33.7% by weight, talc or kaolin 0-18.3% by weight, biocide 0.1-0.3% by weight, and ammonia 0.1-0.3% by weight.

The volume solids percentage of the first coating component can be at least 40%. For example, the volume solids percentage of the first coating component can at least 45%, at least 50%, at least 55%, at least 60%, at least 65%, at least 70%, or at least 75%.

The weight solids percentage of the first coating component can be at least 50%. For example, the weight solids percentage of the first coating component can be at least 55%, at least 60%, at least 65%, at least 70%, at least 75%, or at least 80%.

The second coating component can comprise a flocculant. For example, the second coating component can be an aqueous solution or suspension of a flocculant. Flocculants, sometimes referred to as coagulants, are substances that precipitate solids or semi-solids from solution, such as polymeric particles from a latex dispersion, or impurities from water. Exemplary flocculants are known in the art, and include charged polymers (see, for example, U.S. Pat. No. 5,219,914 to Warburton which is incorporated by reference herein in its entirety) and multivalent metal salts, including suitable zinc, iron, calcium, and aluminum salts (see, for example, U.S. Pat. No. 3,823,024 to Cogliano, U.S. Pat. No. 4,386,992 to Kunishiga, et al., U.S. Pat. No. 4,571,415 to Jordan, and U.S. Pat. No. 5,403,393 to Dubble, as well as U.S. Patent Application Publication No. 2004/0000329 to Albu, et al., all of which are incorporated by reference herein in their entirety). In some embodiments, the flocculant can comprise $CaCl_2$.

The second coating component can comprise an effective amount of a flocculant, such that when the second coating component is combined with the first coating component, the addition of the flocculant decreases the stability of the dispersion of one or more polymers in the first coating component, causing the coating to set more quickly.

The first coating component and the second coating component can be provided as separate aqueous compositions (e.g., in a kit as the first and second components of two-part aqueous coating composition). The first coating component and the second coating component that can be co-applied (e.g., simultaneously or sequentially) to a substrate (e.g., as a film) and allowed to dry to form a dried coating. The first coating component and the second coating component may not form a coating if applied alone, but the combination of the first coating component and the second coating component produces a coating on the surface.

Generally, coatings are formed by applying the first coating component and the second coating component of the two-part aqueous coating compositions as described herein to a surface, and allowing the coating to dry to form a dried coating. The surface can be, for example, a PVC pipe, concrete, brick, mortar, asphalt, a granulated asphaltic cap sheet, carpet, a granule, pavement, a ceiling tile, a sport surface, an exterior insulation and finish system (EIFS), a vehicle, a spray polyurethane foam surface, a metal, a thermoplastic polyolefin surface, an ethylene-propylene diene monomer (EPDM) surface, a modified bitumen surface, a roof, a wall, a storage tank, and another coating surface (in the case of recoating applications). In some embodiments, the surface can be an architectural surface. In some embodiments, the surface can be a substantially horizontal surface such as a roof surface. In some embodiments, the surface can be a substantially vertical surface such as a wall. In some embodiments, the coating composition can be applied to floors to provide moisture control to provide crack-bridging properties.

The first coating component and the second coating component can be applied to a surface by any suitable coating technique, including spraying, rolling, brushing, or spreading. The first coating component and the second coating component can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating. The first coating component can be applied in combination with the second coating composition to form a rapid set coating. The second coating component can be applied to a surface prior to applying the first coating component, applied to a surface simultaneously with the first coating component, or applied to a coating of the first coating component after it has been applied to a surface but prior to drying.

In certain embodiments, the first coating component and the second coating component are simultaneously applied to the surface to be coated (e.g., to an architectural surface such as a roof or wall). For example, the first coating component and the second coating component can be sprayed as converging or overlapping streams which mix as they are applied to the surface. In these embodiments, the first coating component and the second coating component can be simultaneously applied using a machine configured to spray both the first coating component (e.g., a polymer dispersion) and the second coating component (e.g., a flocculant) on to a surface such that the spraying areas overlap. Suitable machines include application systems which include two separate spray guns regulated such that the spraying areas of the two separate spray guns overlap, as well as application systems which include a single spray gun having two separate spray nozzles having overlapping spraying areas (e.g., spray guns configured for external mixing available from Binks Manufacturing Co., Franklin Park, Ill.). Alternatively, the first coating component and the second coating component can be simultaneously applied using a single sprayer configured to internally mix the first coating component and the second coating component prior to application.

In certain embodiments, the first coating component and the second coating component are simultaneously applied to a surface using a spray system which includes a single spray gun having first and second nozzles, a first pump fluidly connected between the first nozzle and a first solution reservoir for delivering the first coating component to the first nozzle at a first fluid pressure, and a second pump fluidly connected between the second nozzle and a second solution reservoir for delivering the second coating component to the second nozzle at a second fluid pressure. Spray systems of this type are known in the art. See, for example, U.S. Patent Application Publication Nos. 2007/0186813 and 2010/0173089 to Smith, which are incorporated herein by reference in their entirety.

In some embodiments, the first coating component can be applied at a viscosity of at least 50 cP (e.g., at least 100 cP, at least 500 cP, at least 1,000 cP, at least 2,000 cP, at least 5,000 cP, at least 10,000 cP, at least 12,000 cP, at least 15,000 cP, at least 20,000 cP, at least 25,000 cP, at least 30,000 cP, or at least 35,000 cP) measured using a Brookfield RV viscometer with spindle #3 at 2 rpm at 20° C. In some embodiments, the first coating component can be applied at a viscosity of 40,000 cP or less (e.g., 35,000 cP or less, 30,000 cP or less, 25,000 cP or less, 20,000 cP or less, 15,000 cP or less, 12,000 cP or less, 10,000 cP or less, 5,000 cP or less, 2,000 cP or less, 1,000 cP or less, 500 cP or less, or 100 cP or less) measured using a Brookfield RV viscometer with spindle #3 at 2 rpm at 20° C.

The first coating component can be applied at a viscosity ranging from any of the minimum values described above to any of the maximum values described above. For example, in some embodiments, the first coating component can be and can be applied at a viscosity of from 50 cP to 40,000 cP measured using a Brookfield RV viscometer with spindle #3 at 2 rpm at 20° C. In some embodiments, the first coating component can have a viscosity of from 500 to 30,000 cP, from 1,000 to 12,000 cP, from 2,000 to 12,000 cP, from 2,000 to 8,000 cP, or from 2,000 to 5,000 cP.

In some embodiments, the weight ratio of the dry weight of flocculant in the second coating component to the dry weight of polymer in the first coating component is from 0.1:16 to 5:16. The weight ratio of polymer is based on the total dry weight of polymer in the first component, and is the total dry weight of the first polymer and the second polymer in cases where the first coating component includes two polymers. In some embodiments, the weight ratio can be 0.1:16 or greater, 0.3:16 or greater, 0.5:16 or greater, 1:16 or greater, 1:8 or greater, 3:16 or greater, or 1:4 or greater. In some embodiments, the weight ratio can be 5:16 or less, 1:4 or less, 3:16 or less, 1:8 or less, 1:16 or less, 0.5:16 or less, or 0.3:16 or less. In some embodiments, the weight ratio can be from 0.1:16 to 5:16, 0.3:16 to 4:16, 0.5:16 to 3:16, or 1:16 to 3:16. In some embodiments, the weight ratio can be from 1:16 to 5:16.

The thickness of the resultant coatings can vary depending upon the application of the coating. For example, the coating can have a dry thickness of at least 10 mils (e.g., at least 15 mils, at least 20 mils, at least 25 mils, at least 30 mils, or at least 40 mils). In some instances, the coating has a dry thickness of less than 100 mils (e.g., less than 90 mils, less than 80 mils, less than 75 mils, less than 60 mils, less than 50 mils, less than 40 mils, less than 35 mils, or less than 30 mils). In some embodiments, the coating has a dry thickness of between 10 mils and 100 mils. In certain embodiments, the coating has a dry thickness of between 10 mils and 40 mils.

The first coating component and the second coating component can be applied as a film, dried, subjected to an accelerated weathering process to simulate extended field exposure for 1000 hours or more, and then subjected to the mandrel bend test set forth in ASTM D 6083-05 at −26° C. (or −18° C.). In some embodiments, the first coating component and the second coating component described herein when applied in combinations as a film, dried and weathered passes the mandrel bend test set forth in ASTM D 6083-05 at −26° C. In some embodiments, the first coating component and the second coating component described herein when applied in combinations as a film, dried and weathered passes the mandrel bend test set forth in ASTM D 6083-05 at −18° C.

The elongation at break of the coatings formed from the first coating component and the second coating component described herein can be measured according to ASTM D-2370. Generally, the coatings display an elongation at break after a drying period of at least 14 days, as measured according to ASTM D-2370 of at least 90% (e.g., at least 95%, at least 100%, at least 110%, at least 120%, at least 130%, at least 140%, at least 150%, at least 160%, at least 170%, at least 180%, at least 190%, or at least 200%). In some embodiments, the coatings display an elongation at break after 1,000 of accelerated weathering, as measured according to ASTM D-2370 of at least 90% (e.g., at least 95%, at least 100%, at least 110%, at least 120%, at least 130%, at least 140%, at least 150%, at least 160%, at least 170%, at least 180%, at least 190%, or at least 200%).

The tensile strength of coatings formed from the first coating component and the second coating component described herein can be measured according to ASTM D-2370. Generally, the coatings display tensile after a drying period of at least 14 days, as measured according to ASTM D-2370 of at least 140 psi (e.g., at least 150 psi, at least 160 psi, at least 170 psi, at least 180 psi, at least 190 psi, at least 200 psi, at least 210 psi, at least 220 psi, or at least 225 psi). In some embodiments, the coatings display tensile strength after 1,000 of accelerated weathering, as measured according to ASTM D-2370 of at least 140 psi (e.g., at least 150 psi, at least 160 psi, at least 170 psi, at least 180 psi, at least 190 psi, at least 200 psi, at least 210 psi, at least 220 psi, or at least 225 psi)

In certain embodiments, the coating formed from the first coating component and the second coating component is an elastomeric roof coating. In certain embodiments, the coating will generally satisfy the requirements of ASTM D6083-05, entitled "Standard Specification for Liquid Applied Acrylic Coating Used in Roofing". In particular embodiments, the coating has a tensile strength of greater than 200 psi, and an elongation at break of greater than 100%, according to ASTM D-2370, after 1,000 hours of accelerated weathering.

The examples below are intended to further illustrate certain aspects of the methods and compositions described herein, and are not intended to limit the scope of the claims.

EXAMPLES

Two-Part Rapid Cure Coating Compositions

Prior to testing, the first coating component and second coating component of a two-part coating composition were separately prepared.

The first coating component was prepared using the ingredients listed in Table 1 below. Specifically, 11.13-15.55 wt % water, 1.11-1.55 wt % of coalescent, 0.38-0.61 wt % dispersant, 0.11-0.16 wt % of biocide, 5.56-7.77 wt % of titanium dioxide, and 13.35-13.94 wt % of aluminum trihydrate were combined and mixed at high speed until homogeneous.

To this mixture, 42.66-59.60 wt % of Polymer Dispersion, 0.10-0.14 wt % of ammonia, 0.37-0.52 wt % of defoamer, and a premixed slurry of 0.04-0.07 wt % of thickener and 0.16-0.28 wt % of propylene glycol were added. The ingredients were mixed until homogeneous. The Polymer Dispersion was a 2:1 by weight mixture of an aqueous dispersion of a first acrylic polymer and an aqueous dispersion of a second acrylic polymer. The first acrylic polymer was an acrylic polymer having a Tg of −6° C. derived from methyl methacrylate, n-butylacrylate, 2-ethylhexylacrylate, methacrylic acid, diacetone acrylamide, and adipic dihydrazide. The second acrylic polymer was either (i) an acrylic polymer having a Tg of −28° C. derived from methyl methacrylate, n-butylacrylate, 2-ethylhexylacrylate, methacrylic acid, diacetone acrylamide, and adipic dihydrazide); or (ii) an acrylic polymer having a Tg of −28° C. derived from methyl methacrylate, n-butylacrylate, 2-ethylhexylacrylate, acrylic acid, and acetoacetoxyethyl methacrylate (AAEM).

The resulting first coating component was 59% solids by weight and had a pH of 8.5-9.0. The viscosity of the first coating component, as determined by a Brookfield viscometer (spindle #3 at 50 rpm), was 330-378 cP.

TABLE 1

| | Ingredients | First Coating Component Example 1 | |
|---|---|---|---|
| | | Weight % | Volume % |
| Pigment Grind | Water | 11.13-15.55 | 15.63-18.42 |
| | Coalescent (non-ionic surfactant) | 1.11-1.55 | 1.57-1.84 |
| | Dispersant 1 | 0.31-0.51 | 0.36-0.72 |
| | Biocide | 0.11-0.16 | 0.16-0.19 |
| | Dispersant 2 | 0.07-0.10 | 0.11-0.13 |
| | Titanium Dioxide | 5.56-7.77 | 2.02-2.38 |

TABLE 1-continued

| | Ingredients | First Coating Component Example 1 | |
|---|---|---|---|
| | | Weight % | Volume % |
| | Aluminum Trihydrate | 13.35-13.94 | 6.83-7.75 |
| | Calcium Carbonate | 0-24.82 | 0-12.87 |
| | Total for Pigment Grind | 39.39-56.68 | 30.16-40.83 |
| Additions to Pigment Grind | Polymer Dispersion | 42.66-59.60 | 58.19-68.58 |
| | Ammonia | 0.10-0.14 | 0.15-0.18 |
| | Defoamer | 0.37-0.52 | 0.57-0.67 |
| | Thickener | 0.04-0.07 | 0.05-0.09 |
| | Propylene glycol | 0.16-0.28 | 0.22-0.33 |
| | Total for Coating Composition | 100.0 | 100.0 |

A second coating component was a flocculant solution prepared by mixing 192 g of a flocculant with 1 L water.

The first coating component and the second coating component were co-sprayed onto a vertically oriented piece of high density polyethylene using a dual nozzle atomizer. The ratio of component A to component B was 10:1 on a wet basis. The two-part system was sprayed to a thickness of up to 80 mil. The two-part system adhered to the surface of the substrate with no visible runoff of the coating. Additionally, the coating could be lightly touched within minutes with no transfer of the coating (only water) or damage caused to the surface of the coating. The properties of the resultant coatings are detailed in Table 2 below. The typical thickness of these coatings was from 20-50 mils (dry film thickness).

The tensile strength and elongation at break of films formed by the two-part system described above were measured after fourteen days and after 1,000 hours accelerated weathering in a Xenon arc weatherometer according to the methods described in ASTM D-2370-98(2010), entitled "Standard Test Method for Tensile Properties of Organic Coatings," which is hereby incorporated by reference in its entirety.

The wet adhesion and dry adhesion of films formed by the two-part system described above to both steel and foam substrates were measured using a modified version of the methods described in ASTM C-794(2010), entitled "Standard Test Method for Adhesion-in-Peel of Elastomeric Joint Sealants," which is hereby incorporated by reference in its entirety. The methods described in ASTM C-794 were modified as follows to accommodate the rapid-set nature of the two-part systems. Specifically, these methods employ an embedded scrim sandwiched between two coats of a material undergoing testing. The protocol described in ASTM C-794 was modified such that the first coat of the material undergoing testing (the coat in contact with the substrate) was formed by spraying the two-part system on the substrate, while the second coat of the material undergoing testing (the coat applied over the scrim) was formed by spraying only the first coating component on the inlaid scrim. All other aspects of the method were consistent with those described in ASTM C-794.

The water vapor permeance of films formed by the two-part system described above was measured according to the methods described in ASTM D1653-13, entitled "Standard Test Methods for Water Vapor Transmission of Organic Coating Films," which is hereby incorporated by reference in its entirety, as well as the two methods described in ASTM E96/E96M-14, entitled "Standard Test Methods for Water Vapor Transmission of Materials," which is hereby incorporated by reference in its entirety. The values reported for ASTM D1653 were generated using inverted perm cups (Test Method B). The values reported for ASTM E96, Method A were generated using the dry cup/desiccant method. The values reported for ASTM E96, Method B were generated using wet cup/water method.

The flexibility of films formed by the two-part system described above was tested after fourteen days and after 1,000 hours accelerated weathering in a Xenon arc weatherometer according to the methods described in ASTM D522/D522M-13, entitled "Standard Test Methods for Mandrel Bend Test of Attached Organic Coatings," which is hereby incorporated by reference in its entirety. After 1,000 hours accelerated weathering, films passed the flexibility test (0.5 inch mandrel bend at a temperature of −18° C.) set forth in ASTM D522.

TABLE 2

| Properties | Units | Typical Range |
|---|---|---|
| 14 Day Cure (22° C., 40-60% RH) | | |
| Tensile strength | PSI | 130-325 |
| Elongation | % | 190-800 |
| After 1000 Hours Xenon Arc | | |
| Tensile strength | PSI | 240-600 |
| Elongation | % | 150-950 |
| Adhesion Properties | | |
| Dry Adhesion, Steel | pli | 2.00-10.00 |
| Wet Adhesion, Steel | pli | 2.00-6.00 |
| Dry Adhesion, Foam | pli | 4.00-10.00 |
| Wet Adhesion, Foam | pli | 2.00-11.00 |
| Water Permeability | | |
| Inverted Permeance (ASTM D1653) | Perms | 2.7-12 |
| Permeance (ASTM E-96, Method A) | Perms | 0.5-6 |
| Permeance (ASTM E-96, Method B) | Perms | 1-25 |
| Mandrel Bend (@−18° C.) - 3 days CTH cure - 5 days oven @ 50° C. | | |
| (Pass/Fail) | P/F | P |
| Mandrel Bend (@−18° C.) - After 1000 hrs Xenon Arc WOM | | |
| (Pass/Fail) | P/F | P |

The compositions, products, and methods of the appended claims are not limited in scope by the specific compositions, products, and methods described herein, which are intended as illustrations of a few aspects of the claims and any compositions, products, and methods that are functionally equivalent are intended to fall within the scope of the claims. Various modifications of the compositions, products, and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. A two-part aqueous coating composition, comprising:
   a first coating component comprising a first polymer derived from two or more monomers including a (meth)acrylate monomer and an acid monomer, the first polymer having a Tg of from −28° C. to 50° C., said first coating component having a viscosity of from 50 to 40,000 cP measured using a Brookfield RV viscometer with spindle #3 at 2 rpm at 20° C.; and
   a second coating component comprising a flocculant, wherein the flocculant does not include a charged polymer,
   wherein the weight ratio of the dry weight of flocculant in the second coating component to the dry weight of polymer in the first coating component is from 0.1:16 to 0.3:16, and
   wherein the first coating component and the second coating component, when applied in combination as a film, has a tensile strength of at least 170 psi after 14 days, as described in ASTM D-2370.

2. The composition of claim 1, wherein the first coating component has a viscosity of from 50 cP to 15,000 cP measured using a Brookfield RV viscometer with spindle #3 at 2 rpm at 20° C.

3. The composition of claim 1, wherein the first polymer is derived from greater than 0 to 5% by weight of the acid monomer.

4. The composition of claim 1, wherein the first polymer is derived from at least one low $T_g$ monomer selected from the group consisting of butyl acrylate and 2-ethylhexyl acrylate.

5. The composition of claim 1, wherein the first polymer is derived from at least one high $T_g$ monomer selected from the group consisting of methyl methacrylate and styrene.

6. The composition of claim 1, wherein the first polymer is derived from (meth)acrylamide.

7. The composition of claim 1, wherein the first polymer is derived from greater than 0 to 5% by weight of a crosslinkable monomer.

8. The composition of claim 1, wherein the first polymer has a $T_g$ of from −28° C. to 0° C.

9. The composition of claim 1, wherein the first coating component comprises:
   a first polymer produced by emulsion polymerization and derived from two or more monomers including a (meth)acrylate monomer and an acid monomer, said first polymer having a $T_g$ of from −28° C. to −5° C. and being present in the first coating component in an amount of 10-90% by weight, based on the total polymer content of the first coating component; and
   a second polymer produced by emulsion polymerization and derived from two or more monomers including a (meth)acrylate monomer and an acid monomer, said second polymer having a $T_g$ from −15° C. to 50° C. and above the $T_g$ of the first polymer, the second polymer being present in the first coating component in an amount of 10-90% by weight, based on the total polymer content of the first coating component.

10. The composition of claim 9, wherein the first polymer has a $T_g$ of from −28° C. to −23° C.

11. The composition of claim 9, wherein the second polymer has a $T_g$ of from −12° C. to 25° C.

12. The composition of claim 9, wherein the first polymer and the second polymer are each derived from at least one low $T_g$ monomer selected from the group consisting of butyl acrylate and 2-ethylhexyl acrylate.

13. The composition of claim 9, wherein at least one of the first polymer and the second polymer is further derived from at least one high $T_g$ monomer selected from the group consisting of methyl methacrylate and styrene.

14. The composition of claim 9, wherein at least one of the first polymer and the second polymer is further derived from a crosslinkable monomer.

15. The composition of claim 9, wherein the first coating component comprises
a first polymer produced by emulsion polymerization and derived from monomers including one of more of butyl acrylate and 2-ethylhexyl acrylate, one or more acid monomers, a crosslinkable monomer, and optionally styrene or methyl methacrylate, said first polymer having a $T_g$ of from −28° C. to −23° C.; and
a second polymer produced by emulsion polymerization and derived from one or more monomers including one of more of butyl acrylate and 2-ethylhexyl acrylate, one or more acid monomers, a crosslinkable monomer, and optionally styrene or methyl methacrylate, said second polymer having a $T_g$ of from −12° C. to 0° C.

16. The composition of claim 1, wherein the first coating component and the second coating component, when applied in combination as a film, dried and weathered for 1000 hours passes the mandrel bend test set forth in ASTM D 6083-05 at −18° C.

17. The composition of claim 1, wherein the first coating component and the second coating component, when applied in combination as a film, dried and weathered for 1000 hours as described in ASTM D-2370 has a tensile strength of greater than 140 psi.

18. A method of coating a surface comprising simultaneously applying the first coating component and the second coating component of the composition of claim 1 to the surface.

19. The composition of claim 1, wherein the flocculant includes a chloride salt.

20. The composition of claim 1, wherein the flocculant includes calcium chloride.

21. The composition of claim 1, wherein the first polymer is further derived from a crosslinkable monomer selected from the group consisting of diacetone acrylamide, a monomer comprising 1,3-diketo groups, a silane crosslinker, or a combination thereof.

22. The composition of claim 1, wherein the flocculant includes an aluminum salt.

\* \* \* \* \*